United States Patent [19]

Audeh

[11] Patent Number: 4,627,964
[45] Date of Patent: Dec. 9, 1986

[54] PROCESS FOR THE REMOVAL OF HYDROGEN SULFIDE FROM SOUR GAS

[75] Inventor: Costandi A. Audeh, Princeton, N.J.

[73] Assignee: Mobil Oil Corporation, New York, N.Y.

[21] Appl. No.: 786,415

[22] Filed: Oct. 10, 1985

[51] Int. Cl.$^4$ .................. C01B 17/16; C01B 31/20
[52] U.S. Cl. .................. 423/228; 208/428; 423/210; 423/234; 423/514
[58] Field of Search .......... 423/228, 234, 514, 210 M, 423/210 S; 208/428

[56] References Cited

U.S. PATENT DOCUMENTS

| | | | |
|---|---|---|---|
| 3,777,010 | 12/1973 | Nicksie et al. | 423/228 |
| 3,840,653 | 10/1974 | Diemer et al. | 423/234 |
| 4,395,385 | 7/1983 | Welsh | 423/234 |
| 4,400,361 | 8/1983 | Shafer | 423/226 |
| 4,401,642 | 8/1983 | Blytas et al. | 423/573 |
| 4,461,754 | 7/1984 | Diaz | 423/573 |
| 4,462,968 | 7/1984 | Tazuma et al. | 423/228 |
| 4,518,572 | 5/1985 | Ritter | 423/234 |

OTHER PUBLICATIONS

Encyclopedia of Chemical Reactions, Jacobson, vol. VII, p. 143, 1958.

Primary Examiner—John Doll
Assistant Examiner—Lori S. Freeman
Attorney, Agent, or Firm—Alexander J. McKillop; Michael G. Gilman; Charles A. Malone

[57] ABSTRACT

A process for the removal of hydrogen sulfide from sour gas or other gases produced upon the retorting of shale by the injection of an aqueous ammonia solution. Further, this process reduces the amount of arsenic present in product oil formed in the retort process.

25 Claims, 1 Drawing Figure

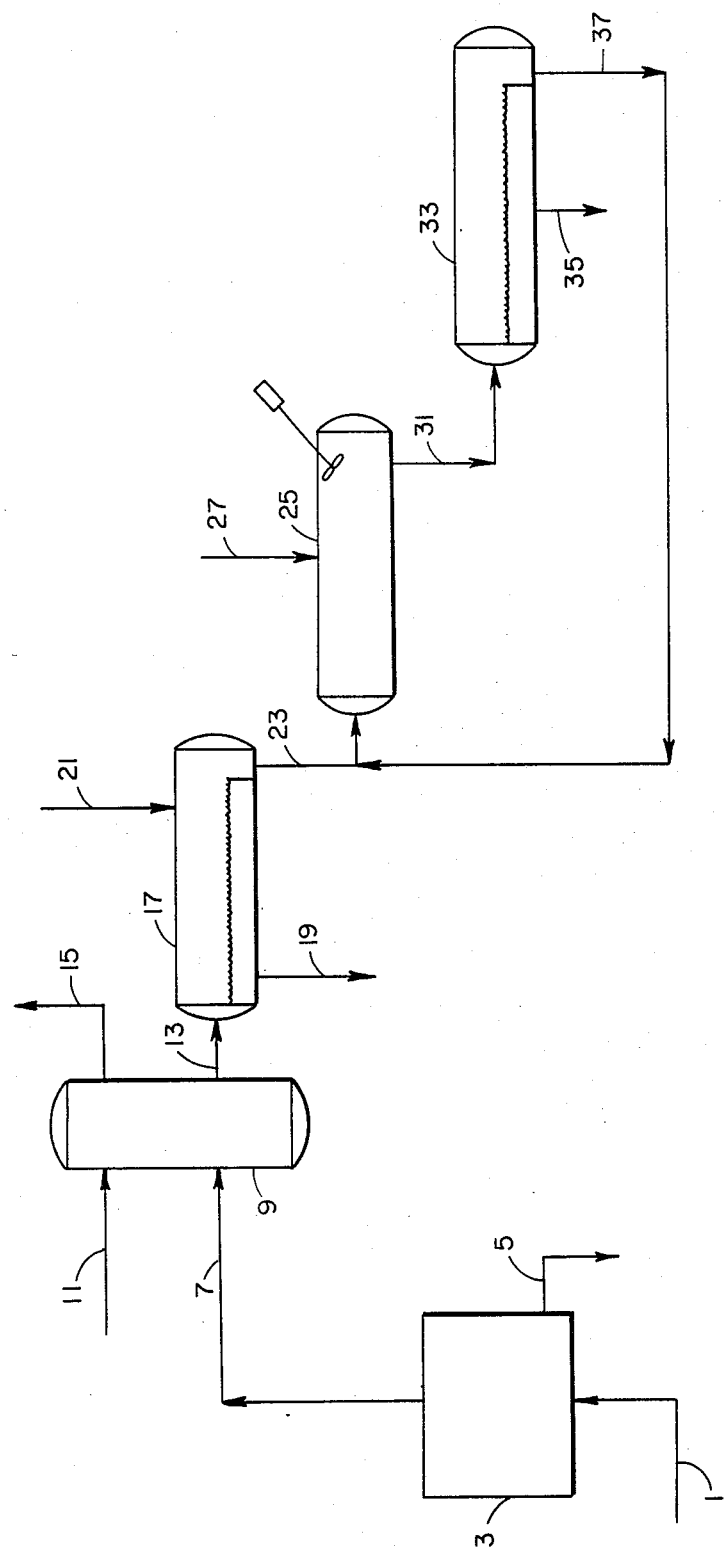

PROCESS FOR THE REMOVAL OF HYDROGEN SULFIDE FROM SOUR GAS

BACKGROUND OF THE INVENTION

1. Field of the Invention

The present invention relates to a process for the elimination of hydrogen sulfide from oil shale. Further, this process facilitates subsequent removal of arsenic from product oil produced in a oil shale retort.

2. Description of the Prior Art

Shale-oil deposits in the United States occur over a wide area with the most extensive in the Devonian-Mississippian shales of the United States. Additional deposits are present in the Green River Formation of Colorado, Utah and Wyoming. These vast deposits offer an important potential reserve of hydrocarbons in the face of the eventual depletion of conventional sources of oil. Various methods, such as, retorting and pyrolysis are used to remove oil and other hydrocarbons from shale. Various other techniques that are used commercially are illustrated in Kirk-Othmer, Vol. 16, pp. 333-352 (John Wiley and Sons, New York). However, air pollution in the form of gases containing sulfur, nitrogen oxides, carbon monoxides and trace elements are serious problems that result from these techniques.

Eastern shales of the United States are known to contain pyrite. Some eastern shales contain significant amounts of pyrite resulting in the production of copious amounts of hydrogen sulfide during any retorting process or thermal conversion process.

In some shales, such as the New Albany shales of Kentucky, Ohio and Indiana, the amount of hydrogen sulfide produced upon retorting could represent 20 percent of the products. Because of the nature of oil shale retorting, the gaseous products are difficult to separate from the liquid products. Usually the product of retorting is a mist which has to be condensed to provide an oil fraction and a gaseous fraction.

As generated, the gas from shale retorting contains hydrogen sulfide, droplets of oil that were not condensed by the oil recovery system and all the non-condensable compounds formed during the retorting process. Usually the gas generated during a shale oil retorting operation is a fuel source for the retorting process. With the current environmental concerns, fuels containing sulfur are not acceptable unless their sulfur is reduced to acceptable levels. For example, the current sulfur specifications for natural gas dictate a hydrogen sulfide content of less than 0.5 percent by weight. Clearly, the use of the gas generated in most shale oil retorting is not acceptable without a hydrogen sulfide removal procedure.

One of the most efficient and commercially applicable processes for the removal of hydrogen sulfide is the alkanolamine process. In this process, sour gas, with a minimum amount of condensable hydrocarbons, is reacted with an alkanolamine to form an alkanolamine hydrogen sulfide salt and a hydrogen sulfide-free gas. If condensables are present in the gas stream being treated, process difficulties, such as, foaming and severe temperature fluctuations, result. Thus, to minimize processing difficulties in the hydrogen sulfide removal operation it is be desirable to have a condensable-free gas feed. In any oil shale retorting process this is very difficult to achieve. Thus, treating the gas generated in an oil shale retorting process without removing the condensables results is a downstream problem which has to be addressed.

Heretofore, it has been recognized that it would be highly desirable to eliminate or substantially eliminate the pyritic content of shale thereby minimizing the hydrogen sulfide content of the gases from oil shale retorting. In this regard, a number of processes have been suggested for reducing pyritic sulfur in shale.

For example, it is known that some pyritic sulfur can be physically removed from shale by grinding the shale or subjecting the shale to froth flotation or washing processes. While such processes may be desirable for the removal of pyritic sulfur from shale, they are not fully satisfactory because a significant amount of the pyritic sulfur is not removed. Attempts to increase the portion of pyritic sulfur removed have not been successful because these processes are insufficiently selective and can result in a large portion of the shale being discarded along with the pyrite.

In view of this difficulty, chemical treatment of sour gas has been employed in an effort to reduce the hydrogen sulfide content and to ultimately reduce pollution caused by this gas.

The most commercially used process involves the use of monoethanolamine or diethanolamine in an aqueous solution to absorb hydrogen sulfide and carbon dioxide from sour gas. The basic design includes an absorber in which a lean water solution of either alkanolamine absorbs the acid gases (hydrogen sulfide and carbon dioxide) from the sour gas and a stripper in which heat, usually in the form of steam, separates the acid gases from the pregnant amine solution.

U.S. Pat. No. 4,461,754 to Zaida describes another approach for the removal of hydrogen sulfide and carbon dioxide from a variety of gas streams. The gas stream containing the sour gas is contacted with an aqueous solution of a specific reactant ligand or chelate, or mixtures thereof, optionally in an absorbent which contains specific stabilizers for improvement of ligand life. The hydrogen sulfide is converted to sulfur, $CO_2$ is absorbed to produce a purified gas stream, and the reactant ligand is reduced.

U.S. Pat. No. 4,400,361 to Shafer describes a process for the removal of hydrogen sulfide from sour gas streams. Accordingly, sour gas is passed in concurrent flow relationship with a liquid alkaline absorption solution containing a vanadium-boron complex characterized by reacting liquid alkaline solution with the $H_2S$ thereby oxiding (HS—) to elemental sulfur in conjunction with reduction of the vanadium, while the boron constituent is functional to inhibit formation of insoluble vanadium sulfide compounds. Regeneration of the absorption medium by contact with an oxygen-containing gas is enhanced by the provision of an iron-polyamine organic acid oxidation catalyst in the absorption liquid.

U.S. Pat. No. 4,395,385 to Welsh describes a process for removing hydrogen sulfide from sour gas. This process comprises contacting a sour gas stream with an aqueous alkali metal hydroxide solution containing a stoichiometric excess of the alkali metal hydroxide to provide a sweet gas substantially free of hydrogen sulfide and a partially spent aqueous alkali metal solution. The partially spent aqueous alkali metal solution is contacted with a second sour gas stream in a countercurrent fashion to provide a second sweet gas and a substantially caustic-free aqueous solution of the alkali metal hydrosulfide.

U.S. Pat. No. 4,401,642 to Bleztas, et al., describes a process for sweetening sour gas. The process is characterized by the conversion of H₂S to sulfur employing specific aqueous solution reactants. The sulfur is recovered by employing known frothing and extraction techniques.

While the art has provided a number of processes for the removal of hydrogen sulfide from gases produced upon oil shale retort, there still exists a present need for a practical method to more effectively reduce or eliminate the hydrogen sulfide from gases produced from oil shale.

Accordingly, it is one object of the present invention to provide a process for the elimination of hydrogen sulfide from gases produced from oil shale retorting.

It is another object of this invention to provide a method for the substantial reduction of arsenic from product oil obtained from oil shale retorting of oil shale.

The achievement of these and other objects will be apparent from the following description of the subject invention.

BRIEF DESCRIPTION OF THE DRAWINGS

The FIGURE is a schematic view of one system for carrying out the process of the present invention.

SUMMARY OF THE INVENTION

These and other objects are achieved by injecting an aqueous ammonia solution into a sour gas stream that contains hydrogen sulfide and carbon dioxide.

Briefly, this invention relates to a novel process for the removal of hydrogen sulfide from gas formed during shale oil retorting.

In particular, this relates to a process for the removal of hydrogen sulfide from sour gas comprising:

(a) contacting a quantity of an aqueous amino compound-containing solution with a sour gas stream containing hydrogen sulfide and carbon dioxide in a fashion effective to cause reaction between the hydrogen sulfide and the amino compound, said amino compound being present in a molar excess of about 8% to about 12% above the stoichiometric amount necessary to react with the hydrogen sulfide when said hydrogen sulfide is present in said sour gas stream a concentration of about 0.1% by weight to about 5% by weight, and said amino compound being present in a molar excess of about 16% to about 24% above the stoichiometric excess amount necessary to react with the hydrogen sulfide when present in said sour gas stream a concentration of about 6% by weight to about 60% by weight, whereby a treated hydrogen sulfide free gas stream is formed; and thereafter;

(b) separating said hydrogen sulfide free gas stream.

DETAILED DESCRIPTION OF THE INVENTION

The novel process of the present invention can eliminate or substantially eliminate the hydrogen sulfide content of sour gas that is formed during shale retorting by contacting the gas with an aqueous solution of an ammonia or an aliphatic amine. Further, the product oil formed in the retort process can be washed in order to reduce the content of arsenic present in the product oil.

It will be understood that the present invention is broadly applicable to the treatment of all types of shale regardless of the pyritic content of the shale, even if the pyrite content varies greatly in one field.

Numerous mechanisms have been proposed for oil-shale pyrolysis reactions for example:

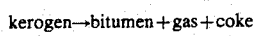

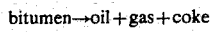

Most oil-shale retorting processes are carried out at 480° C. to maximize liquid-product yield. The effect of increasing retort temperature from 400° C. to 870° C. have been studied with the following results: the oil yield decreased and the yield of retort gas increased with increased retorting temperature, the oil became more aromatic as temperature increased, and maximum yields of olefinic gases occurred at 760° C.

Any conventional method for producing hydrocarbons from oil shale can be utilized in the present invention. As is known by those skilled in the art, the Nevada-Texas-Utah (NTU) retort, Gas-Combustion (GCR) Retort, and Steam-Gas Recirculation (SGR) are representative examples. See Kirk-Othmer, Vol. 16, pp. 333–352 (John Wiley & Sons, New York).

The process of the present invention envisions the use of an aqueous solution of ammonia or an aliphatic amine to remove hydrogen sulfide from sour gas produced during oil shale retorting. The ammonia or aliphatic amine should be diluted in water to give a solution containing 0.3 mols/100 gm. of solution to 1.5 mols/100 gms. of solution preferably 0.6 mol/100 g. of solution. The actual weight used depends on the molecular weight of the compound chosen.

The present invention contemplates the use of aqueous ammonia or aliphatic amine solution to remove hydrogen sulfide present in sour gas. The aliphatic amines within the scope of the present invention are amines with an alkyl group of 1 to 4 carbon atoms, with an alkyl group of 2 carbon atoms being preferred. The amount of hydrogen sulfide in the gases from the retort will vary in concentration at different times during the retort process and the present invention is adaptable to achieve the elimination of hydrogen sulfide. Accordingly, in the initial stages of the retorting process, the organic sulfur compounds of the shale will start to decompose and the amount of hydrogen sulfide generated will vary with the amount of sulfur associated with the organic component of the shale. Thus the amount of ammonia or amine solution required in this initial phase will vary. The amount of ammonia or amine solution to be contacted with the hydrogen sulfide should be in excess of about 5% to about 15% of the stoichiometric amount necessary to react with the hydrogen sulfide when present in the retort in the range of about 0.1% wt. to about 5% wt. The preferred amount of ammonia or amine solution will be in excess of about 8% to about 12% of the stoichiometric amount necessary to react with the hydrogen sulfide present in the retort.

In the later phase, as the temperature of the retort approaches 405° C., the pyrite in the shale starts to react with the organic matter and copious amounts of hydrogen sulfide are generated. Thus the amount of ammonia or amine solution in this later phase should be significantly over that required in the initial phase of the retorting. The amount of ammonia or amine solution to be contacted with the hydrogen sulfide should be in excess of about 15% to about 100% of the stoichiometric amount necessary to react with the hydrogen sulfide when present in the retort in excess of 20% wt. The preferred amount of ammonia of amine solution will be in excess of about 20% to about 40% of the stoichiometric amount necessary to react with the hydrogen sulfide present in the retort.

The ammonia or amine solution contacts the hydrogen sulfide present in the retort in a fashion effective to cause a reaction between the solution and the hydrogen sulfide. Any method known to those skilled in the art is contemplated within the scope of this invention. One means of achieving this is to inject or spray the solution into the line from the retort.

The process of the present invention is conducted to form a product mixture, comprising an aqueous layer and an oil layer. The product mixture may be entrapped in a suitable trapping means such as a condenser and thereafter separated by any standard techniques, e.g. settling.

Separation of the hydrogen sulfide free gas from the liquid product is accomplished after the ammonia solution contacts the generated oil. Further, when the ammonia solution mixes with the liquid product it acts as a coolant for the oil. The condensate of this process is essentially made up of the retort oil, water formed in the oil shale retorting, the reaction product of the hydrogen sulfide and ammonia and excess aqueous ammonia.

The oil layer produced can be subjected to repeated washing with water in order to purify this component. The amount of water used for each washing should be equal to the volume of the oil to be washed subsequent to each washing, the aqueous layer is allowed to separate from the oil layer by any conventional separating technique, i.e. settling and decantation. After the last washing procedure, the separated oil can be processed and the wash water is collected and conveyed to waste water treatment to further remove any environmentally harmful components.

Additionally, it has been found that the use of an aqueous ammonia or an aliphatic amine solution in accordance with the present invention substantially reduces the amount of arsenic in the product oil formed by the oil retort process.

The aqueous layer that was initially separated after the ammonia wash contains the reaction product of hydrogen sulfide and ammonia, essentially ammonium hydrosulfide. This reaction product can be used in a variety of ways. For example, it can be oxidized over any commercially available copper salt catalyst to yield ammonium thiosulfate, a product useful in the photographic industry.

In order to illustrate the preferred embodiment of the present invention in which the hydrogen sulfide content of sour gas is eliminated, the FIGURE is presented. In accordance with the system shown in this figure, shale is fed into retort vessel 3 via inlet line 1. The retort vessel is equipped with a heating means (not shown) and exit line 5 to periodically remove spent shale from the retorting process. The gaseous products containing entrained liquid products are discharged from retort apparatus 3 via exit line 7 into packed column 9. In column 9, the gaseous and liquid products are contacted with an aqueous solution containing an amino-compound that enters via inlet line 11. Upon the completion of the reaction of the amino compound containing solution and the gaseous and liquid products, the hydrogen sulfide free hydrocarbon gas is vented through exit line 15 for conventional recovery process or use in an industrial process. The condensate formed during the reaction of the amino compound containing solution and the liquid product is discharged via exit line 13 to separator 17. Upon separation of the condensate into an aqueous layer and an oil layer, the aqueous layer is discharged via exit 19. The aqueous layer can be sent for down stream waste water treatment or oxidized with air over a copper salt catalyst to provide ammonium thiosulfate. The oil layer may be washed with water via inlet line 21. After separation, the oil is discharged via exit line 23 to mixing vessel 25. In vessel 25, the oil is mixed with water from inlet line 27 and the oil water mixture is discharged via exit 31 to separator 33. Upon separation, the water is discharged via exit line 35 and can be combined with the water from line 19 and sent downstream for the waste water treatment. The separated oil is discharged via exit line 37. The oil in line 37 can be sent for downstream processing or can be reintroduced into mixing vessel 25 for further washing if desired.

The following examples are presented as specific embodiments of the present invention and show some of the unique characteristics of the instant process and are not to be considered as constituting a limitation on the present invention.

EXAMPLE 1

Step 1:
The oil shale in the retort was heated by applying heat externally to the retort.

Step 2:
As the temperature of the fresh shale in the retort reached about 275° C., the temperature at which hydrogen sulfide formation starts, a solution of ammonia in water was sprayed into the line carrying the gaseous products from the retort so as to intercept the generated hydrogen sulfide. At this stage of the retorting cycle, the organic sulfur compounds of the shale started to decompose and the amount of the hydrogen sulfide generated varied with the amount of sulfur associated with the organic component of the shale. Concomitantly the amount of ammonia required varied and was introduced in such a way as to provide about a stoichiometric 10% molar excess over that required to react with the hydrogen sulfide, i.e., one mole of hydrogen sulfide should have 1.1 moles of ammonia for its reaction. At this stage only trace amounts of hydrogen sulfide were being formed in the retort.

Step 3:
As the temperature of the retort approached about 405° C., the pyrite in the shale started to react with the decomposing organic matter and copious amounts of hydrogen sulfide were generated. In this step, the ammonia injection had to be adjusted so as to maintain a 20% molar stoichiometric excess over the hydrogen sulfide. This was necessary to insure that the reaction of ammonia with the generated hydrogen sulfide went to completion.

Step 4:
Since in the retorting process the gaseous and liquid products leave the retort from the same retort outlet, the ammonia solution also contacted the generated oil and mixed with it, acted as a coolant for the oil and essentially removed the oil from the hydrogen sulfide-free gas. The condensate was essentially made up of the retort oil, retort waters usually formed in oil shale retorting, the reaction product of the hydrogen sulfide with the added ammonia and the excess added aqueous ammonia. In this step the condensed materials, as described above, were separated into an aqueous layer and an oil layer. This oil layer was washed 2 or 3 times with water. The amount of water used in each washing was equal to the volume of oil to be washed. After each washing the aqueous layer was allowed to separate from the oil layer. After the last water wash, the separated oil was sent for downstream processing, the various wash waters were mixed and sent for waste water treatment. The aqueous layer initially separated after the ammonia wash contained the reaction product of hydrogen sulfide and ammonia, essentially ammonium hydrosulfide. This aqueous product could also be sent for waste water treatment or could be oxidized with air over a copper salt catalyst to provide ammonium thiosulfate, a useful product in the photographic industry

EXAMPLE 2

In this example, 100 gms of an eastern shale containing 5.8% pyrite were taken from a 5000 gram master batch and retorted according to the procedure of Example 1. The products of the retorting were 92 gms of spent shale, 4.3 gms of product oil which contains 9 parts per million of arsenic, 1.2 litres of gas, 1.5 gms of water, and 1.1 gms of hydrogen sulfide which were collected in a cadmium sulfate trap.

EXAMPLE 3

This example demonstrated how the addition of ammonia in aqueous solution removed all the hydrogen sulfide from the gas and produced oil with a reduced arsenic content. 100 gms of an eastern shale were taken from the same 5000 gram batch used in Example 2 and retorted in accordance with Example 1. However, in this case about 30 ml of an aqueous solution containing 14 percent by weight ammonia was used to react or contact the products of the retort. At about 225° C. the ammonia solution was injected into the retort vessel at a rate of 1.2 ml per minute for 25 minutes. The products of the retorting when employing the ammonia injection in accordance with the present invention were 92 gms of spent shale, 4.3 gms of product oil, 1.2 liters of gas and a water layer that weighed 32.5 gms. No hydrogen sulfide was collected in a cadmium sulfate trap.

EXAMPLE 4

This example followed the procedure of Example 3, except that the concentration of the ammonia was 10 percent by weight. The products of this procedure were 92 gms of spent shale, 4.3 gms of product oil, 1.2 liters of gas, and a water layer that weighed 32.5 gms. No hydrogen sulfide was collected in the cadmium sulfate trap.

EXAMPLE 5

This example demonstrated the use of an amine compound for the removal of hydrogen sulfide from gas generated during the retort of oil shale. In this case, 100 gms of shale were taken from the same 5000 gm batch used in Example 2 and retorted according to the procedure described in Example 1. The amine compound employed in this example was diethylamine. An aqueous solution which contained 23 percent by weight of diethylamine was used to contact the gaseous products from the shale retorting products. At about 370° C. the aqueous amine was injected at a rate of 1 ml per minute for 8 min. As the temperature increased and the rate of evolution of hydrogen sulfide increased, the rate of injection of the aqueous amine was also increased. The following table summarizes the rates used:
1.2 ml per min. for 1 min.
1.5 ml per min. for 1 min.
1.8 ml per min. for 8 min. and
1.0 ml per min. for 1 min.

In all, 23 ml of the aqueous amine were added throughout the process of retorting shale. The products of this example were 92 gms of spent shale, 4.3 gms of product oil, 1.2 liters of gas and a water layer that weighed 25.5 gms. Further, no hydrogen sulfide was collected in the cadmium sulfate trap.

EXAMPLE 6

The procedure of Example 5 was repeated in all respects except that the amine solution was a 25 percent aqueous solution of n-propylamine. The results were substantially the same on those obtained in of Example 5 except that a small amount of hydrogen sulfide was trapped in the cadmium sulfate trap.

EXAMPLE 7

This example demonstrated the effictiveness of the injection of aqueous ammonia into the line carrying the gaseous product in the reduction of arsenic in the product oil generated by the retort of shale. The product oil of Example 2 was found to contain 9 parts per million arsenic and repeated washing with 15 ml of water did not reduce the arsenic content. However, oil separated from Example 3 and washed with 15 ml of water as described for the oil from Example 2 above reduced the arsenic content to 3 parts per million.

Obviously, other modifications and variations of the present invention are possible in the light of the above teachings. It is therefore, to be understood that changes may be made in the particular embodiments of this invention which are within the full intended scope of the invention as defined by the appended claims.

What is claimed is:
1. A process for removing hydrogen sulfide from sour gas and arsenic from shale oil produced during oil shale retoring comprising:
  (a) decomposing said oil shale in a retort thereby forming a sour gas containing hydrogen sulfide and a shale oil containing arsenic;
  (b) introducing into the retort at retoring temperatures an aqueous ammonia or amino compound solution in an amount sufficient to react with hydrogen sulfide in said sour gas and arsenic in said shale oil; and
  (c) separating the generated shale oil into an aqueous layer and an oil layer and washing said oil layer with water thereby removing said hydrogen sulfide, substantially removing said arsenic and cooling said shale oil.
2. The process as defined in claim 1, wherein said amino compound is represented by the formula

$NHR_2$ wherein R is a hydrogen atom or an alkyl group of 1 to 4 carbon atoms.
3. The process as defined in claim 2, wherein R is hydrogen.
4. The process as defined in claim 2, wherein R is ethyl.
5. The process defined in claim 1 wherein the volume of water to the volume of oil in the washing step is in a ratio of about 1 to about 5.
6. The process as defined in claim 5, including the steps of separating said oil layer and water.

7. The process as defined in claim 6, comprising the additional steps of contacting the aqueous layer with a catalyst whereby ammonium thiosulfate is formed.

8. The process as defined in claim 1 where in step (b), said solution is introduced into said retort by spraying or injecting.

9. The process as defined in claim 1 where in step (b) said retoritng temperatures are from about 275° C. to about 405° C.

10. The process as defined in claim 1 where said oil shale contains at least 5.8 wt. % pyrite.

11. The process as defined in claim 1 where the arsenic content of said shale oil is reduced from about 9 parts per million to about 3 parts per million.

12. The process as defined in claim 1 where said amino compound is present in a molar excess of about 8% to about 12% above the stoichiometric amount necessary to react with the hydrogen sulfide when present in said sour gas stream in a concentration of about 0.1% by weight to about 5% by weight, and said amino compound is present in a molar excess of about 16% to about 24% above the stoichiometric excess amount necessary to react with the hydrogen sulfide when present in said sour gas stream in a concentration of about 6% by weight to about 60% by weight.

13. The process as defined in claim 1 where said ammonia is in excess of about 20% to about 40% of the stoichiometric amount necessary to react with said hydrogen sulfide.

14. A process for removing hydrogen sulfide from sour gas and arsenic from shale oil produced during oil shale retoritng comprising:
(a) decomposing said oil shale in a retort thereby forming a sour gas containing hydrogen sulfide and a shale oil containing arsenic;
(b) introducing into the retort at a temperature from about 275° C. to about 405° C., an aqueous ammonia or amino compound solution in an amount sufficient to react with hydrogen sulfide in said sour gas and arsenic in said shale oil;
(c) separating said hydrogen sulfide free gas from said solution; and
(d) separating the generated shale oil into an aqueous layer and an oil layer and washing said oil layer with water thereby producing a shale oil substantially reduced in arsenic content and cooling said shale oil.

15. The process as defined in claim 14, wherein said amino compound is represented by the formula

NHR$_2$ wherein R is a hydrogen atom or an alkyl group of 1 to 4 carbon atoms.

16. The process as defined in claim 15, wherein R is hydrogen.

17. The process as defined in claim 15, wherein R is ethyl.

18. The process as defined in claim 14 wherein the volume of water to the volume of oil in the washing step is in a ratio of about 1 to about 5.

19. The process as defined in claim 18, including the steps of separating said oil layer and water.

20. The process as defined in claim 19, comprising the additional steps of contacting the aqueous layer with a catalyst whereby thiosulfate is formed.

21. The process as defined in claim 14 wherein step (b), said solution is introduced into said retort by spraying or injecting.

22. The process as defined in claim 14 where said oil shale contains at least 5.8 wt. % pyrite.

23. The process as defined in claim 14 where the arsenic content of said shale oil is reduced from about per million to about 3 parts per million.

24. The process as defined in claim 14 where said amino compound is present in a molar excess of about 8% to about 12% above the stoichiometric amount necessary to react with the hydrogen sulfide when present in said sour gas stream in a concentration of about 0.1% by weight to about 5% by weight, and said amino compound is present in a molar excess of about 16% to about 24% above the stoichiometric excess amount necessary to react with the hydrogen sulfide when present in said sour gas stream in a concentration of about 6% by weight to about 60% by weight.

25. The process as defined in claim 14 wherein said ammonia is in excess of about 20% to about 40% of the stoichiometric amount necessary to react with said hydrogen sulfide.

* * * * *